United States Patent [19]
Miller

[11] Patent Number: 5,881,540
[45] Date of Patent: Mar. 16, 1999

[54] MOUNTING MEMBER FOR MOWER BLADE SPINDLE

[75] Inventor: Michael Miller, Brunswick, Ohio

[73] Assignee: MTD Products Inc., Cleveland, Ohio

[21] Appl. No.: 593,263

[22] Filed: Jan. 29, 1996

[51] Int. Cl.⁶ .................................................. A01D 34/82
[52] U.S. Cl. ................................. 56/17.5; 56/255; 56/295
[58] Field of Search .......................... 56/17.5, 255, 295, 56/DIG. 17, DIG. 20

[56] References Cited

U.S. PATENT DOCUMENTS

| | | | |
|---|---|---|---|
| 3,564,824 | 2/1971 | Tygh, Jr. | 56/295 |
| 4,936,884 | 6/1990 | Campbell | 56/12.7 |
| 5,284,006 | 2/1994 | Sheldon | 56/255 |
| 5,454,216 | 10/1995 | Myszka | 56/17.5 |

*Primary Examiner*—Terry Lee Melius
*Attorney, Agent, or Firm*—Emerson & Associates; Roger D. Emerson

[57] ABSTRACT

A drive connection between a spindle and a mowing blade wherein the roots of the extending teeth of the interlocking member define an inner diameter substantially equal to the threaded stud utilized to hold the blade on the spindle.

5 Claims, 2 Drawing Sheets

MOUNTING MEMBER FOR MOWER BLADE SPINDLE

FIELD OF THE INVENTION

This invention relates to an improved blade drive interconnection between a spindle and a rotary lawn mower blade.

BACKGROUND OF THE INVENTION

Rotary engine driven lawn mowers have been in existence for many years. Typically, there is an engine driven spindle with a mower blade interconnected to the lower end thereof. The spindles may be used singularly or in multiples, directly driven or indirectly driven as by a belt. Historically, the mower blade is interconnected to the bottom of the spindle by a removable bolt, thus allowing the blade to be removable and replaceable upon selective manipulation of the bolt. Due to the necessity of passing increased torque between the spindle and the blade, and especially due to the need to pass bidirectional torque due to blade brakes and otherwise, there is now more and more frequency a complex interconnection between the blade and the spindle. This has caused manufacturers to provide for some sort of radial solid interconnection between the spindle and the blade in order to pass this torque. Examples of this are shown in the Myszka U.S. Pat. No. 5,454,216 and the Sheldon U.S. Pat. No. 5,284,006. These interconnections are functional in increasing the torque which is capable of being transferred to and from the spindle and the blade. The interconnections are, however, occasionally inconvenient to make due to the necessity of radially and laterally aligning the toothed opening in the blade with the corresponding shape in the spindle to mount the blade on the spindle.

OBJECTS AND SUMMARY OF THE INVENTION

It is an object of the present invention to provide for an easily aligned interconnection between a blade spindle and a mower blade.

It is another object of the present invention to provide for a solid interconnection between a mower blade and a blade spindle.

It is yet another object of the present invention to ease the interconnection between a mowing blade and a spindle.

It is still another object of the present invention to provide for an intuitive interconnection between a blade and a spindle.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent when consideration of the following description is taken in conjunction with the accompanying drawings wherein.

DETAILED DESCRIPTION OF THE INVENTION

Figure 1:
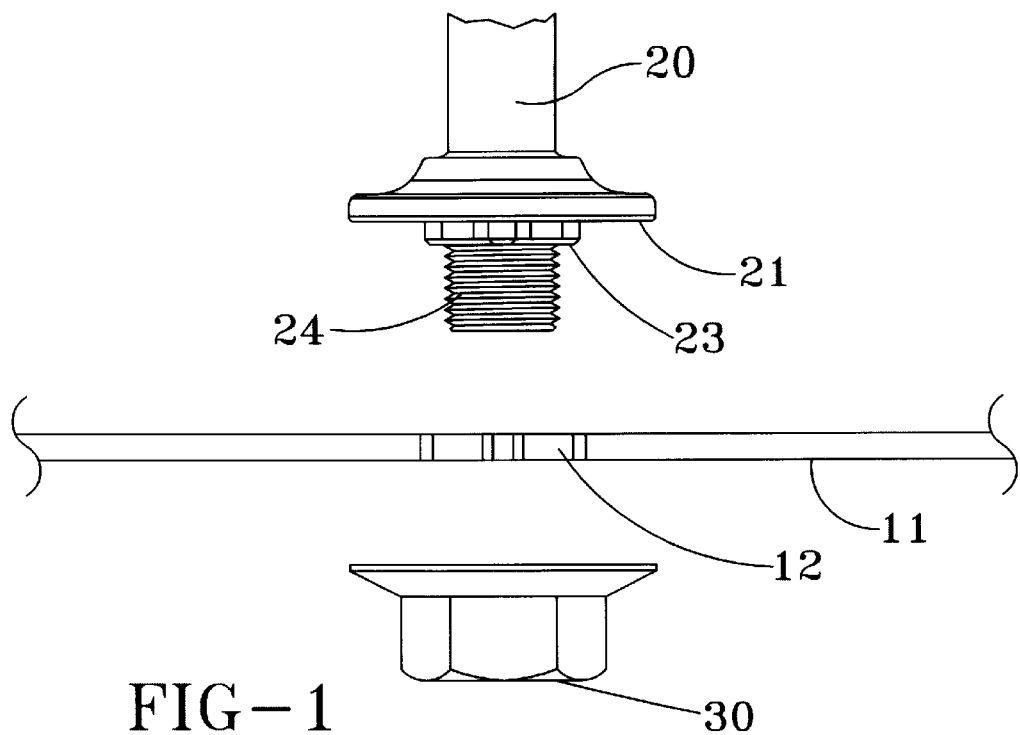
FIG. 1 is a cutaway lateral cross section of the interconnection between a mowing blade and a drive spindle taken generally along lines 1—1 of the spindle of FIG. 2.

The interconnection of this invention is designed for use with a mowing blade 10 and a spindle 20.

The mowing blade 10 is a rotary mowing blade designed to cut vegetation in the normal manner. The blade 10 may be a mulching blade, a conventional blade, or other type of blade. The blade itself includes a flat surface area 11 substantially in the center thereof, with a central mounting hole 12 extending through the center of the flat surface area 11. The shape of the central mounting hole 12 is designed to match the section of the later described blade spindle so as to provide for a solid driving interconnection between the spindle 20 and the blade 10. This shape can be a six pointed star such as in the U.S. Pat. No. 5,454,216, five pedal like key ways such as that shown in the Sheldon U.S. Pat. No. 5,284,006, or differing in shape and/or number as desired.

The blade spindle 20 includes a circular outer flange 21, a recessed section 22, a raised section 23 and a mounting member 24.

The outer flange 21 of the spindle 20 is a flat area designed to hold the mowing blade 10 against lateral flexing in respect to the central axis of the spindle 20. The particular outer flange disclosed is a doughnut shaped flat surface some 1.84 inches in outer diameter and approximately 1.20 inches in inner diameter. This substantially 0.32 inch radius cylindrically shaped flat surface provides a solid bedding location for the mowing blade 10. In the preferred embodiment disclosed, the outer diameter of the flange 21 substantially matches the width of the flat surface area 11 on the mower blade. The outer flange 21 thus supports the mowing blade over its complete width.

The recessed area 22 is located immediately inward of the outer flange 21. The purpose of this recessed area is to allow a slight area of clearance for the forging operation which is utilized to form the raised section 23 of the spindle 20. The recessed area 22 further allows for material to break out in the central mounting hole 12 in the mowing blade 10. This allows the mower blade 10 to mount solidly with the outer diameter of the flange 21. The recessed area in addition allows for some over-tightening of the later described nut 30 with the sections of the blade 10 immediately outside of the central mounting hole 12 flexing slightly into the recessed area 22. This aids in holding the nut 30 in place. The recessed area 22 shown has an outer diameter of approximately 1.20 inches and inner diameter of approximately 0.63 inches (between the teeth of the raised section 23). The recess is approximately 0.03 inches deep.

The raised section 23 of the spindle 20 is the main drive interconnection between spindle 20 and the blade 10. The raised section 23 shown is formed into a toothed star with the central mounting hole 12 in the blade 10 formed with a complementary shape. With this design, the edges of the outwardly extending teeth of the raised section 23 pass the torque between the spindle 20 and mower blade 10. The star shown has six points having an inner diameter subscribing a circle interconnecting the roots of the teeth of 0.63 inches, an outer diameter of 1.00 inches, and a height of approximately 0.115 inches. As previously set forth, the number and shape of the points can differ from that shown in the preferred embodiments.

The teeth 30 of the raised section 23 shown each have an edge 31, a further edge 32 and outer end 33. The edge 31 and further edge 32 are located symmetrically in such that a first line 35 extending from said first edge 31 and a second line 36 in respect to said further edge 32 each form substantially a 20 degree angle in respect to the center line 34 of the teeth 30. The teeth 30 are located symmetrically about the raised section 23 having substantially a 60 degree angle in respect to the center line 34 of the adjoining teeth. With this orientation, the first line 35 of a given tooth 30 intersects an edge 31 of a tooth one removed, with said intersection occurring substantially at the intersection of such line 35 with the outer end 33 of said such other tooth. This orientation optimizes the passage of torque between the spindle 20 and the blade 10 by causing such point of intersection at or near the outer end of the tooth once removed to act as a pivot point in respect to the drive edge 31 of the spindle. This allows for the more efficient passage of torque between the blade and spindle than otherwise by maximizing the effective lever. Similarly, the second line 36 in respect to a further edge 32 of a tooth 30 will intersect a further edge 32 of a tooth one removed in the opposite direction, again substantially at the intersection of such line 36 with the outer end 33 of such other tooth.

Although not technically necessary, the points of transition between the edges and the outer ends of the teeth 30 are radiused by approximately 0.0625 inches. This radius reduces the possibility of point to point contact between the raised section 23 of the spindle and the mowing blade 10 thus strengthening the joint by allowing linear contact with the blade.

The height of the raised section 23 is preferably equal to or slightly less than the thickness of the mowing blade 10. This allows the later described nut 30 to bed on the blade without interference (alternately the nut 30 could include a recessed section to provide clearance for the raised section).

The central hole 12 in the mowing blade 10 is formed complementary to the raised section 23 of the spindle 20. In the embodiment shown, this hole 12 is also a six pointed star having an inner diameter of 0.65 inches, an outer diameter of 1.012 inches, and a depth of 0.12 inches. The outer end of each star is radiused 0.039 inches. Note that the outer ends of the teeth 30 of the spindle 20 are more severely radiused that the corresponding locations of the hole 12 of the blade 10. This difference creates a slight gap between tooth and blade at the very ends of the edges 31 and 32 of the teeth. Further, the difference also provides for a curved line of separation, thus providing a rolling instead of a sharp edge type contact at this critical point. These increase torque and minimizes metal fatigue.

The mounting member 24 is used to hold the blade 10 onto the spindle 20. In a typical spindle assembly, a bolt is used having a significantly lesser diameter than the inside diameter of the key way utilized with such bolt. This allows the blade to shift laterally sidewards during installation Therefore, some lateral shifting is needed to properly align the hole of the blade with the raised section of the spindle until the blade is fully seated upon the circular outer flange accompanying such key way. The bolt, being of a smaller diameter than the hole, does little to facilitate the process. The customary washer between the bolt and blade further complicates the matter by potentially at least partially obscuring visual access to the alignment (not to mention the need to physically manipulating the mower to allow such access in the first place).

Figure 3:
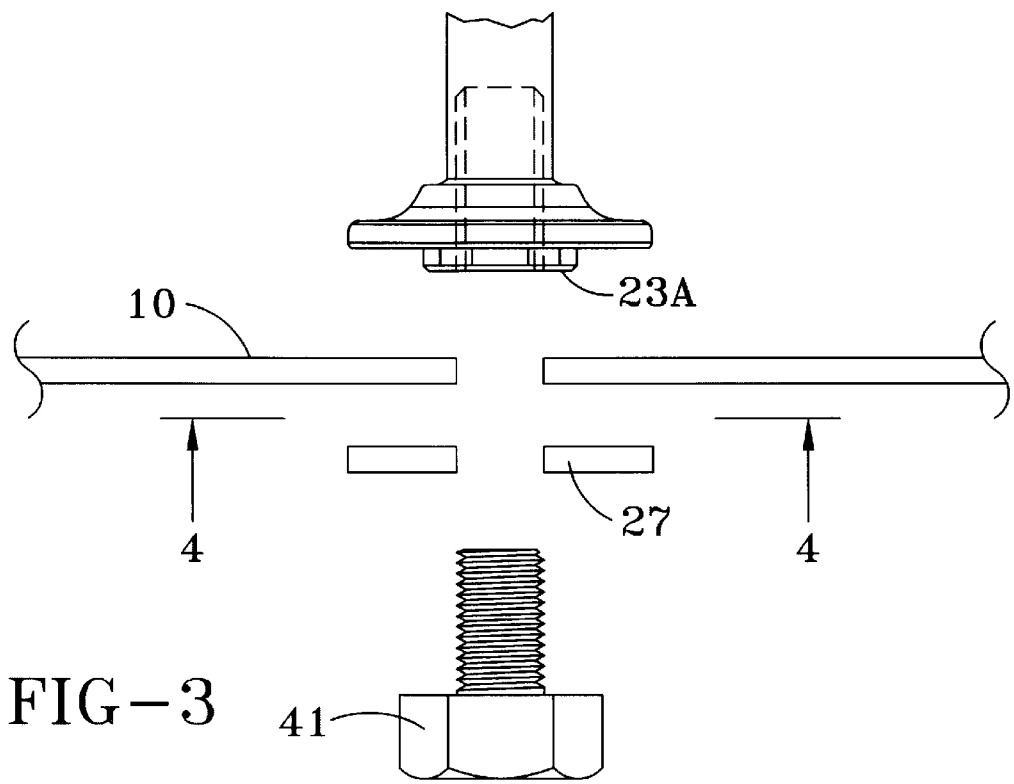
FIG. 3 is a view like FIG. 1 of an alternate embodiment taken generally along lines 3—3 of the spindle of FIG. 4.

In the invention of the present application, the mounting member 24, whether it be a bolt (as shown in FIG. 3 of the preferred embodiment) or threaded stud extension (as shown in FIG. 1 of the preferred embodiment) has a diameter substantially equal to the inner diameter of the teeth 30 of the raised section. This allows for the simple, intuitive interconnection of the mowing blade 10 to the spindle 20 by means of simple rotation of the blade 10 about the mounting member 24—as soon as the respective teeth in the central mounting hole 12 of the blade 10 are aligned with the teeth 30 of the spindle 20, the blade will automatically seat upon the outer flange 21 of the spindle 20. At this time, it is only necessary for the operator to tighten down the mounting member 24 to the spindle, thus locking the blade in proper aligned position on such spindle. This can be readily accomplished by touch without visual input. In contrast with the prior art, it is not necessary to laterally shift the blade—only simple rotation is necessary. This facilitates the operation of interconnecting the blade 10 to the spindle 20. Note that it is preferred that the contact between mounting member 24 and blade be more than a two point contact so as to facilitate rotation. Therefore, three or more points of contact separated 360°/number of points of contact (or two long arcs 180° apart) are preferred.

In the preferred embodiment disclosed, the mounting member 24 is a threaded stud having a ⅝–18 rolled thread and extending approximately 0.68 inches from the outer flange 21 of the spindle 20. The ends of this threaded stud are tapered at approximately 45° to aid in the alignment between the nut and this stud.

A removable attachment member completes the attachment assembly. This removable member cooperates with the remainder of the assembly to selectably retain the blade 10 on the spindle 20. This removable attachment member may be a nut 30 (FIG. 1), a bolt 41 (FIG. 3) or otherwise as appropriate. Note that it is preferred that this attachment member include an enlarged section so as to more solidly bed the blade 10 on the spindle 20. In FIG. 1, the enlarged section 27 is formed integral with the nut. This section 27 has an outer diameter approximately equal to the outer flange 21 of the spindle is utilized between the bolt 40 and lower surface of the mowing blade 10. In FIG. 3, the enlarged section 27 is a separate washer. In both instances, once the mounting member 24 is tightened down, this section 27 cooperates with the outer flange 21 of the spindle 20 and flat surface area 11 of the blade 10 in order to minimize lateral wobbling of the blade in respect to the spindle. This further strengthens the interconnection between the mower and spindle.

Figure 2:
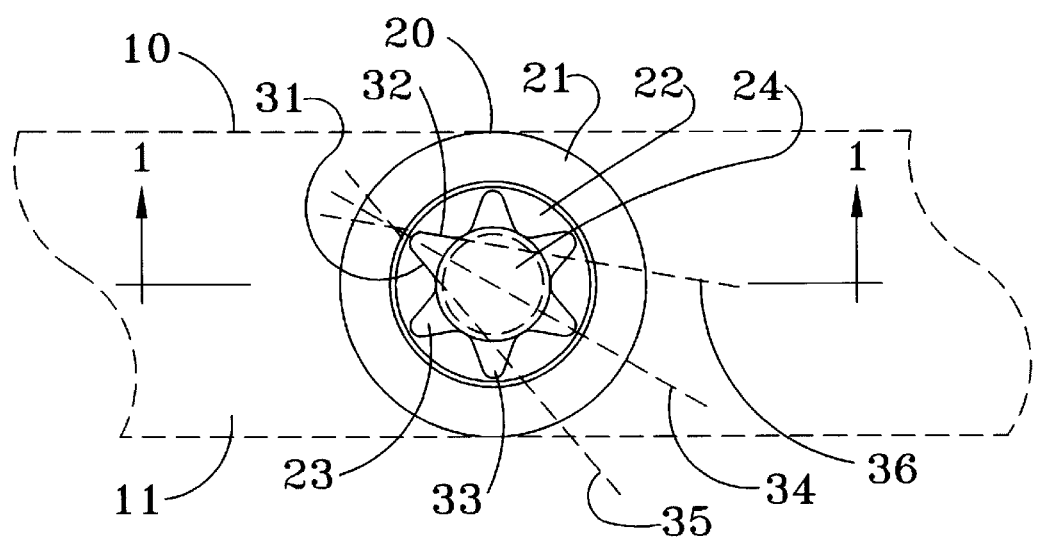
FIG. 2 is a partial top view of the end of the spindle of the interconnection of FIG. 1.
Figure 4:
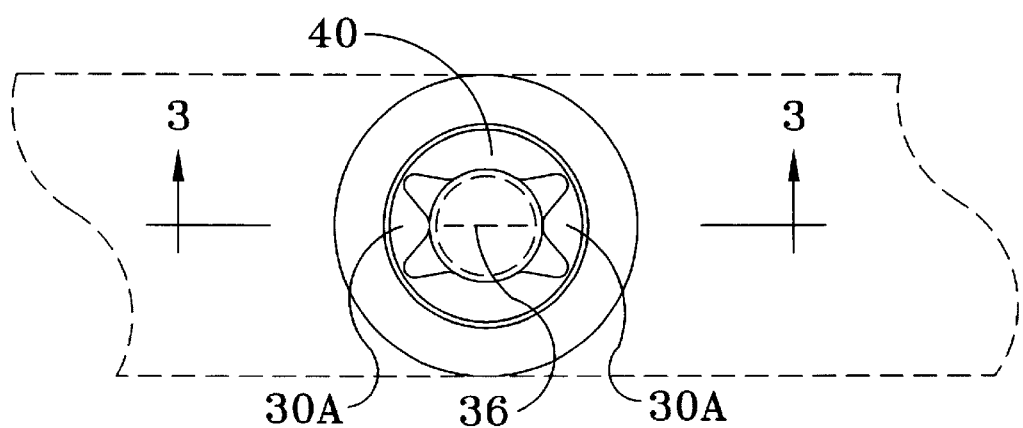
FIG. 4 is a partial top view of the end of the spindle of the alternate embodiment of FIG. 3.

Although the invention has been described in a preferred form with a certain degree of particularity, it is to be realized that numerous changes can be made without deviating from the invention as hereinafter claimed. For example, in the preferred embodiment disclosed in FIGS. 1 and 2 of the present application, the teeth 30 are spaced uniformly around the mounting member, each tooth approximately 60° spaced from the immediately adjoining tooth, and a threaded stud is used as the mounting member 24. It would be possible, however, to incorporate the invention into spindles having non-uniformly spaced teeth, and use a bolt 41 as the mounting member 24. An example of this is shown in FIGS. 3 and 4. This particular raised section 23A is essentially the same as the six pointed raised section 23 of FIGS. 1 and 2 except that two opposing teeth have been eliminated (at 40). This produces the unique raised section 23A of FIG. 3 wherein the teeth 30A are located in two opposing pairs. This adds two semi-circular sections 35 to the raised section 23A, thus further facilitating the alignment process. In this respect, it is noted that in FIG. 3, the longitudinal line 36 between the two opposing pairs of teeth 30A is preferably lined up with the longitudinal axis of the support member and blade. This further eases the interconnection by giving the operator a point of reference for the rotation of these two members so as to align the teeth 30A. Further, the extended arcs of contact between the opposing pairs of teeth 30A spread out the forces of rotation. This facilitates the manufacture by increasing tolerances and eases installation of a blade by providing a longer contact surface for rotation of the blade 10. Other changes of mounting member 24 and key shape are also possible.

I claim:

1. A drive connection for a mowing spindle having an end and a recessed area, and a mowing blade having a hole for receiving said spindle, the end of the spindle having at least two outwardly extending teeth with an inner diameter and the hole of said mowing blade having inwardly extending teeth having an inner diameter substantially equal to said inner diameter of said spindle, the drive connection comprising a mounting member, said mounting member having an outer diameter, said outer diameter of said mounting member being substantially equal to the inner diameter of the extending teeth, and holding means for said mounting member to hold the blade on the spindle.

2. A drive connection for a mowing blade and a spindle, said spindle having an end and a recessed area, said mowing blade having a hole for receiving said spindle, said end of said spindle having at least two outwardly extending teeth with an inner diameter and an outer diameter, said hole of said mowing blade having inwardly extending teeth having an inner diameter substantially equal to said inner diameter of said spindle and an outer diameter substantially equal to said outer diameter of said spindle, said drive connection comprising:

a threaded stud formed integrally with said end of said spindle, said threaded stud having a diameter substantially equal to said inner diameters of said end of said spindle and said hole; and, a nut for holding said blade to said spindle, said nut being secured to said threaded stud.

3. The drive connection of claim 2 wherein:

said inner diameter of said end of said spindle is approximately 0.63 inch;

said inner diameter of said hole of said mowing blade is approximately 0.65 inch; and, said diameter of said threaded stud is substantially equal to 0.63 inch.

4. A drive connection for a mowing blade and a spindle, said spindle having an end and a recessed area, said mowing blade having a hole for receiving said spindle, said end of said spindle having at least two outwardly extending teeth with an inner diameter and an outer diameter, said hole of said mowing blade having inwardly extending teeth having an inner diameter substantially equal to said inner diameter of said spindle and an outer diameter substantially equal to said outer diameter of said spindle, said drive connection comprising:

a bolt having a diameter substantially equal to said inner diameters of said end of said spindle and said hole, said bolt being received by a threaded hole in said end of said spindle.

5. The drive connection of claim 4 wherein:

said inner diameter of said end of said spindle is approximately 0.63 inch;

said inner diameter of said hole of said mowing blade is approximately 0.65 inch; and, said diameter of said bolt is substantially equal to 0.63 inch.

* * * * *